United States Patent [19]

Watanabe

[11] 4,446,170
[45] May 1, 1984

[54] METHOD OF MANUFACTURING A MAGNETIC RECORDING FILM OF A THIN METALLIC FILM TYPE

[75] Inventor: Seizou Watanabe, Tokyo, Japan

[73] Assignee: Olympus Optical Co., Ltd., Tokyo, Japan

[21] Appl. No.: 516,943

[22] Filed: Jul. 25, 1983

[30] Foreign Application Priority Data

Aug. 2, 1982 [JP] Japan .............................. 57-134884

[51] Int. Cl.$^3$ .......................................... H01F 10/02
[52] U.S. Cl. .................................. 427/130; 427/132; 427/172; 427/374.3; 427/380; 427/383.1; 427/177
[58] Field of Search ............ 427/130, 132, 172, 374.3, 427/380, 383.1, 177

Primary Examiner—Bernard D. Pianalto
Attorney, Agent, or Firm—Frishauf, Holtz, Goodman & Woodward

[57] ABSTRACT

A method of manufacturing a magnetic recording film of a thin metallic film type comprises a step of forming a magnetic layer in the form of a thin metallic film on a base film, while providing a predetermined level of tension in the base film; a thermal treatment step of heating the film with the magnetic layer to a first temperature level, at which thermal shrinkage of the base film is caused, while providing the predetermined tension in the film; and, then, cooling the film, thereby removing any curls and wrinkles found therein; and an additional thermal treatment step of heating the thermally treated film to a second temperature level, which is lower than the first temperature level, and cooling the film, thereby removing thermal stress in the magnetic layer.

9 Claims, 10 Drawing Figures

METHOD OF MANUFACTURING A MAGNETIC RECORDING FILM OF A THIN METALLIC FILM TYPE

BACKGROUND OF THE INVENTION

This invention relates to a method of manufacturing a magnetic recording film and, more particularly, to a method of manufacturing a magnetic recording film of a thin metallic film type.

Magnetic tapes of a thin metallic film type have recently been attracting attention as a high density recording medium. Such tapes are manufactured by forming a magnetic layer, as a thin metallic film, on a base film (e.g., a polyester film) by such means as vacuum evaporation, electron beam evaporation, spattering and ion plating. Their magnetic layer can be made very thin, as compared to the magnetic layer of the prior art magnetic tape of a coating type. Thus, their high frequency characteristics of recording and reproduction can be improved and their recording time can be extended, as well. For these reasons, they are well suited to high density recording.

However, in the magnetic tape of a thin metallic film type for extended recording periods, the base film should be very thin. Therefore, when vapor depositing a magnetic material such as a Co-Ni alloy on the base film, the film is subjected to thermal damage resulting in the formation of wrinkles, due to heat radiated from the vapor deposition material source; and, also, due to latent heat possessed by the evaporated metal atoms. In addition, during the process of re-crystallization of the deposited metal atoms, to form a thin film, stress is produced in the base film, due to shrinkage of the thin film. This stress causes the base film to be concavely curled on the magnetic layer side. If a magnetic tape having large wrinkles is used, drop-outs will result. Further, if a curled magnetic tape is driven, vertical movements will occur in the width direction thereof, thus deteriorating the head touch of the tape and resulting in defective tape winding.

To overcome the drawbacks described above, the applicant of the present application had earlier proposed a technique of removing curls and wrinkles by heating the film, after the evaporation process, to a temperature above the temperature of the occurrence of thermal shrinkage, while providing a predetermined tension in the film (as disclosed in Japanese Patent Application No. 56-51547). By this technique, the curls and wrinkles could be removed satisfactorily. However, fluctuations of the magnetic tape output could not be suppressed sufficiently.

SUMMARY OF THE INVENTION

The present invention is directed toward overcoming the above-mentioned deficiency, and its object is to provide a method of manufacturing a magnetic recording film of a thin metallic film type, which has uniform magnetic characteristics and can sufficiently suppress its output fluctuations.

Toward this end, the inventor has conducted extensive research to determine the exact causes of magnetic tape output fluctuations; and, as a result, has concluded that a major cause of output fluctuations is the thermal strain (or thermal stress) that remains locally in the magnetic layer which has been thermally treated for removal of the curls and wrinkles. More specifically, the thermal treatment causes thermal shrinkage of the base film, whereby the curls and wrinkles thereof are removed, and the thermal stress is removed macroscopically. Microscopically, however, a lack of uniformity in the thermal shrinkage of the base film is thought to result. Due to this lack of uniformity, strains (or stresses) are thought to remain locally in the magnetic layer on the base film, giving rise to fluctuations in its magnetic traits. The present invention is predicated on the above supposition. According to the invention, the stresses or strains produced in the magnetic layer, due to local stresses in the base film resulting from lack of uniformity in the shrinkage thereof during thermal treatment, are subsequently removed by re-heating the film to a temperature level lower than the heating temperature of the main thermal treatment. The magnetic characteristics are thus made uniform, to suppress output fluctuations of the magnetic tape.

The method of manufacturing a magnetic recording film according to the present invention comprises a step of forming a magnetic layer, in the form of a thin metallic film, on a base film; a step of heating the film with the magnetic layer to a first temperature level, at which thermal shrinkage of the base film occurs, while providing a predetermined tension in the film and, then cooling the film, to thereby remove any curls and wrinkles which are found therein; and a step of additionally heating the thermally treated film to a second temperature level, which is lower than the first temperature level, to thereby remove local thermal stresses in the magnetic layer.

DETAILED DESCRIPTION OF THE PREFERRED EMBODIMENT

Figure 1:
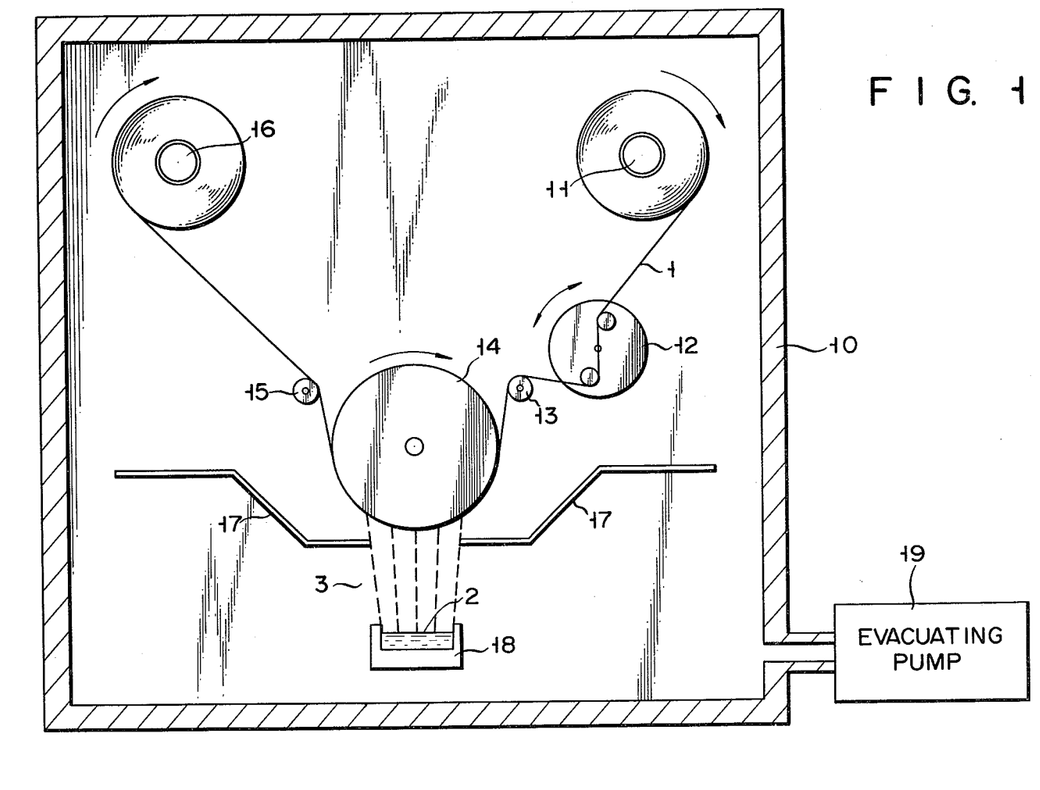
FIG. 1 is a schematic view of a take-up type vacuum evaporation apparatus used in carrying out an embodiment of the invention.

The present invention may now be described in conjunction with an embodiment thereof, with reference to the accompanying drawings. The process of vapor-depositing the magnetic material onto a base film, such as a polyester film will first be described. FIG. 1 is a schematic view of a take-up type vacuum evaporation apparatus. The apparatus has a housing 10, the interior of which is held at a predetermined vacuum degree by an evacuating pump 19. A pay-off reel 11 and a take-up reel 16 are disposed in the housing 10. A base film 1, which is set as a roll on the pay-off reel 11, is paid off therefrom to proceed round a tension roller 12, a guide roller 13, a cooling roller 14 and a guide roller 15 and taken up on the take-up reel 16 as the reel 16 is rotated in the direction of arrow. The driving source for driving the film 1 is a servo-motor (not shown) coupled to the shaft of the reel 16. The running speed of the film 1 is servo-controlled to be in a predetermined range. The tension in the film 1 is held at a predetermined value by applying back tension to the film 1 from the tension roller 12. The tension roller set 12 may be replaced with a belt slip mechanism. As a further alternative, a tension servo mechanism may be provided on each of the reels 11, 16. A tension servo mechanism such as the one disclosed in Japanese Patent Application Nos. 55-92482 and 55-115385 (both of which were filed by the applicant of the present application under the title, "Tension Servo Device") may also be used in the present invention.

A source 18 of the vapor deposition material is disposed just below the cooling roller 14. A magnetic material 2, for instance Ni (nickel), Co (cobalt), Fe (iron) or garnet type magnetic material, is accommodated in the source 18. Between the vapor deposition material source 18 and cooling roller 14 is disposed a screen 17. The screen 17 has an aperture or opening, through which the cooling roller 14 and source 18 face each other. When the magnetic material 2 in the vapor deposition material source 18 is gasified by resistance heating, high frequency induction heating, electron beam heating or like heating method, the evaporated atoms (or molecules) 3 pass through the opening of the screen 17 to be attached to the film 1 proceeding round the lower portion of the cooling roller 14. The evaporated atoms (or molecules) 3 deposited on the film 1 are re-crystallized thereon, whereby a thin metallic film, i.e., a magnetic layer, is formed.

In this vapor deposition process, the film 1 is thermally damaged, resulting in the formation of wrinkles, due to heat radiation from the vapor deposition material source 18, as well as the latent heat of the evaporated atoms (or molecules). Also, curls in the film 1 result from the contraction of the deposited atoms (or molecules) during re-crystallization thereof.

Figure 2:
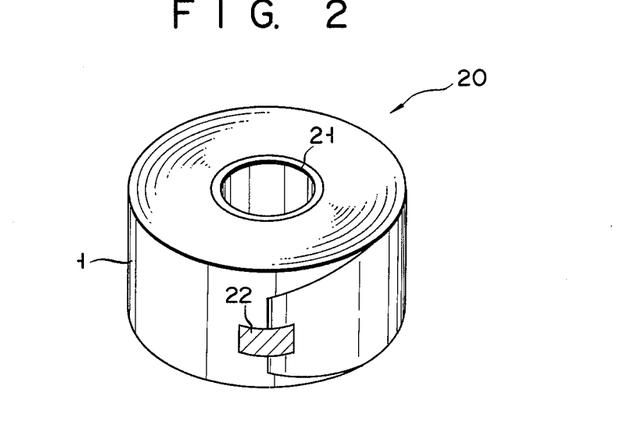
FIG. 2 is a perspective view of a film roll.

The process of removing the curls and wrinkles, through thermal treatment of the film 1 with the magnetic layer formed thereon, may be described as follows. FIG. 2 shows the film 1 with the magnetic layer thereon, which is taken up as a roll 20 on the take-up reel 16 (FIG. 1). The film 1 with the magnetic layer formed thereon is taken up on a hub 21 of the take-up reel 16 with a constant tension provided in the film 1. The trailing end of the film of the roll 20 is secured to the periphery of the roll 20 by a tape 22. The film 1 of the roll 20 is thus held under a constant tension substantially equal to the film tension at the time of the formation of the magnetic layer over its entire length. The roll 20 is set in a heating vessel (not shown) and thermally treated. The thermal treatment of the film 1 thus can be done without need of providing any particular tensioning means.

Figure 3:
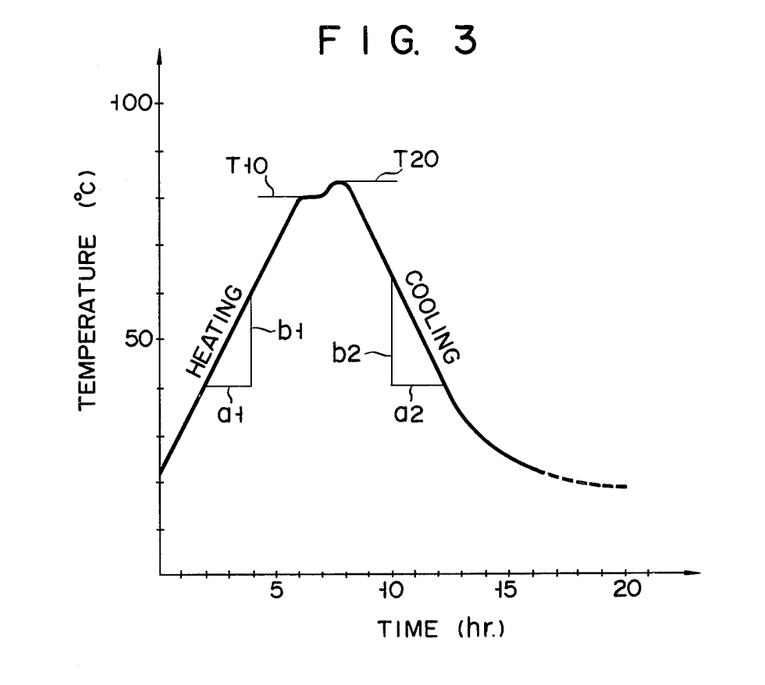
FIG. 3 is a graph showing an example of thermal treatment conditions.

FIG. 3 shows an example of the conditions of thermal treatment. In the Figure, the ordinate is taken of inner temperature of the thermal treatment vessel, and the abscissa is taken for time. The film roll 20 is first set into the heating vessel, and the inner temperature of the vessel is then elevated at a rate of $b_1/a_1$, up to a reaction-free temperature T1, which is slightly lower than the temperature at which thermal shrinkage of the film 1 takes place. The roll 20 is held at the constant temperature T10 for a predetermined period of time, thereby making the temperature distribution over the film 1 of the roll 20 uniform immediately before causing a thermal shrinkage reaction. This is done to reduce the difference between the temperatures before and after the thermal shrinkage reaction. After the entire roll 20 has reached a substantially uniform temperature, the inner temperature of the heating vessel is increased to a thermal shrinkage reaction temperature (first temperature) T20, at which the thermal shrinkage reaction of the film 1 gradually takes place. The heating of the film 1 to this temperature T2 has an effect of removing the curls and wrinkles of the film 1. After the curls and wrinkles are removed, the heating vessel is cooled down at a rate $b_2/a_2$. The absolute values of the temperature increase rate $b_1/a_1$ and cooling rate $b_2/a_2$ are preferably selected to be equal. By so doing, the curls can be removed from the film 1 of the roll 20 readily and completely without formation of new wrinkles during the cooling of the roll 20. The optimal conditions of thermal treatment, such as the heating and cooling rates and heating temperature, is suitably altered, depending on the material of the base film, the kind of magnetic material, the thickness of the magnetic layer, etc. It is necessary to select an adequate degree of tension for the film 1. If the degree of tension is inadequate, the wrinkles and curls cannot be removed satisfactorily, while excessive tension will result in an unnecessary elongation of the film 1. These problems can be overcome by setting the film tension during the thermal treatment at substantially the same level as the tension applied during formation of the magnetic layer.

In the method according to the invention, after the thermal treatment of the film 1 described above is completed, the film 1 is thermally re-treated at a second temperature level, which is lower than the heating temperature (first temperature) of the main thermal treatment. The additional thermal treatment, for instance, is done as follows. After the main thermal treatment the roll 20 is unwound, and is then rewound, while providing substantially the same degree of tension as that applied at the time of formation of the magnetic layer on the film 1, thereby forming a roll 20 (see FIG. 2). The roll 20 is set in the same heating vessel as for the main thermal treatment, and the inner temperature of the vessel is elevated to the second temperature lower than the first temperature noted above. The vessel inner temperature is held at the second temperature for a predetermined period of time, and then it is reduced to cool down the roll 20. In this additional thermal treatment, the heating and cooling rates are preferably set to be substantially equal. The conditions of this thermal treatment, such as the heating temperature (second temperature) and heating and cooling rates, however, may again be set appropriately, depending on the material of the base film 1, kind of magnetic film, etc.

After the main thermal treatment, the base film 1 will have local thermally shrunk portions which result from removal of the curls and wrinkles. This means that the magnetic layer on the base film 1 will have local thermally strained (i.e., thermally stressed) portions. The additional thermal treatment, which follows the main thermal treatment, has the effect of removing local stresses in the magnetic layer, resulting from the non-uniform thermal shrinkage of the base film 1. Thus, it is possible to make the magnetic characteristics uniform and suppress fluctuations of the magnetic tape output.

The magnetic recording film obtained in the manner described above, i.e., by vapor deposition formation of the magnetic layer on the base film 1, removing the curls and wrinkles through the main thermal treatment and removing local thermal stresses in the magnetic layer through the additional thermal treatment, is cut to a predetermined width to obtain a magnetic tape product.

Figure 4:
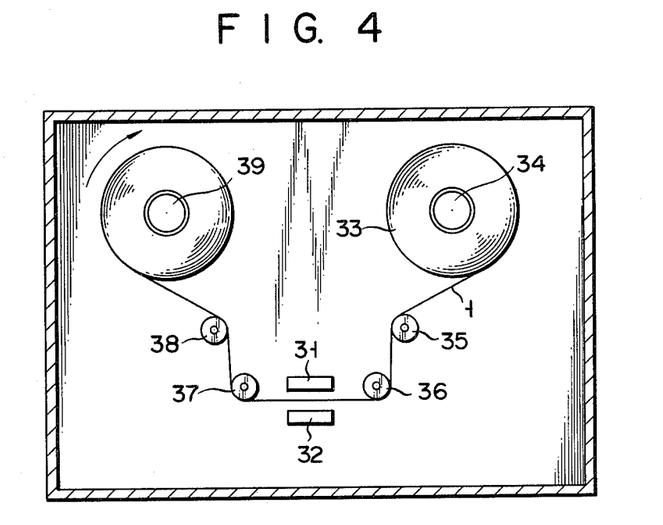
FIGS. 4 and 5 are schematic views of thermal treatment apparatuses using heaters in carrying out further embodiments of the invention.
Figure 5:
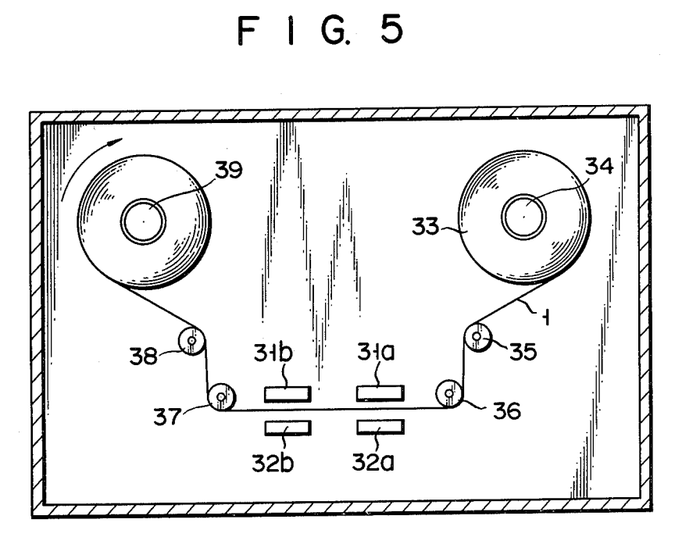

In the above embodiment, the main and additional thermal treatments were done by setting the film 1 with the magnetic layer in the form of the roll 20 in the heating vessel. The main and additional thermal treatments may be done using the apparatus shown in FIG. 4, as well. The apparatus of FIG. 4 has heaters 31 and 32. A tape roll 33 after the vapor deposition process or main thermal treatment is set on a pay-off reel 34. The film 1 with the magnetic layer is paid off the roll 33 to proceed round guide rollers 35 to 38 and be taken up on a take-up reel 39. The heaters 31, 32 are disposed on the upper and lower sides of the film run between the guide rollers 36, 37, at a suitable distance from each other. The film 1 is processed at a predetermined tension level provided by tension servo mechanisms on reels 34 and 39, the thermal treatment is done under predetermined conditions by the heaters 31, 32. FIG. 5 shows a modification of the apparatus of FIG. 4. In this instance, two pairs of heaters 31a, 32a and 31b, 32b are used. The use of two or more heater pairs arranged side by side along the path of the film 1, can extend the freedom of the setting of conditions of the thermal treatment on the film 1, thus permitting further improvement of the flatness and magnetic characteristics of the film 1.

Figure 6:
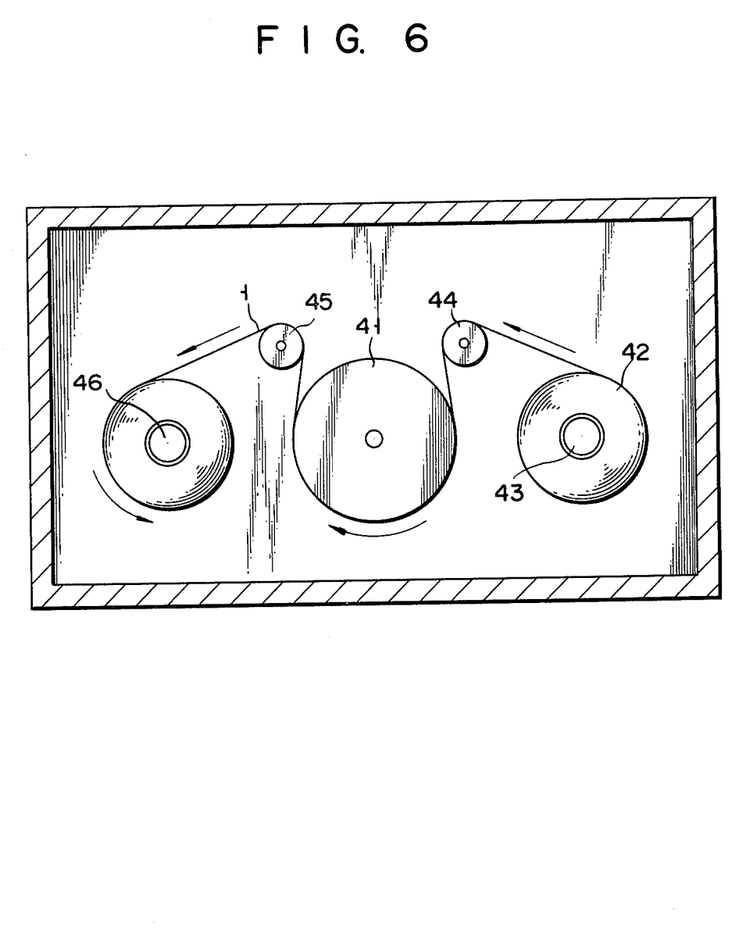
FIG. 6 is a schematic view of a thermal treatment apparatus using a heating roller.
Figure 7A:
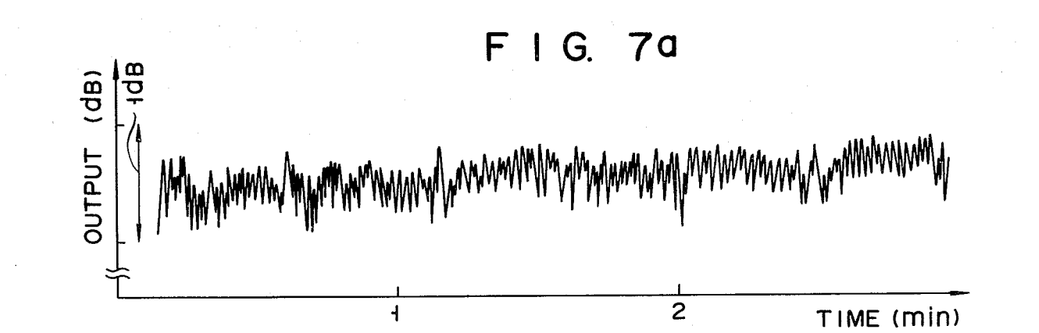
FIGS. 7a and 8a are graphs showing output characteristics of magnetic tapes additionally thermally treated according to the invention.
Figure 7B:
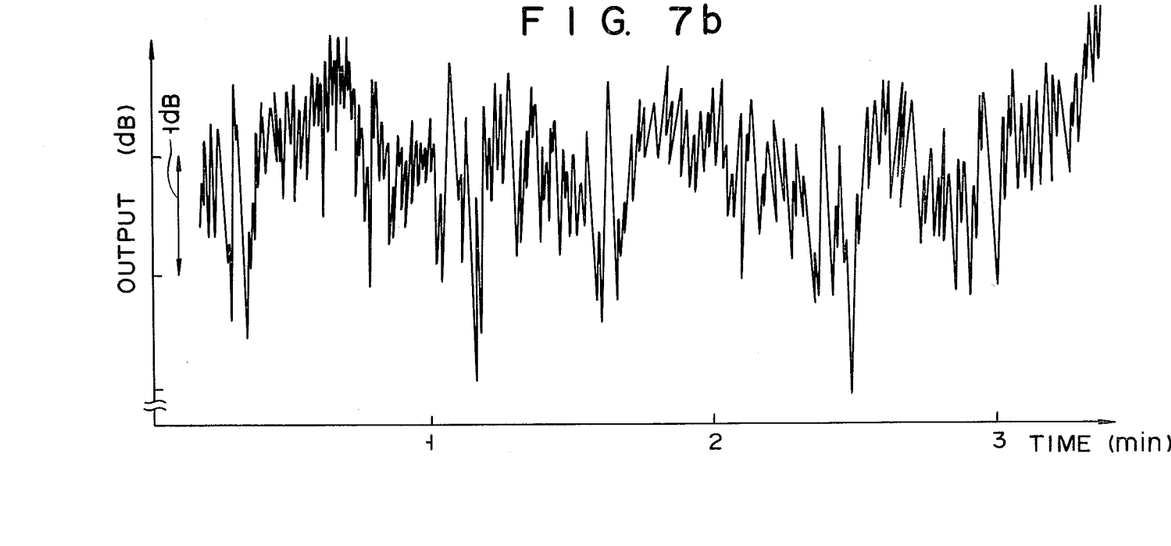
FIGS. 7b and 8b are graphs showing output characteristics of magnetic tapes which are not additionally thermally treated.
Figure 8A:
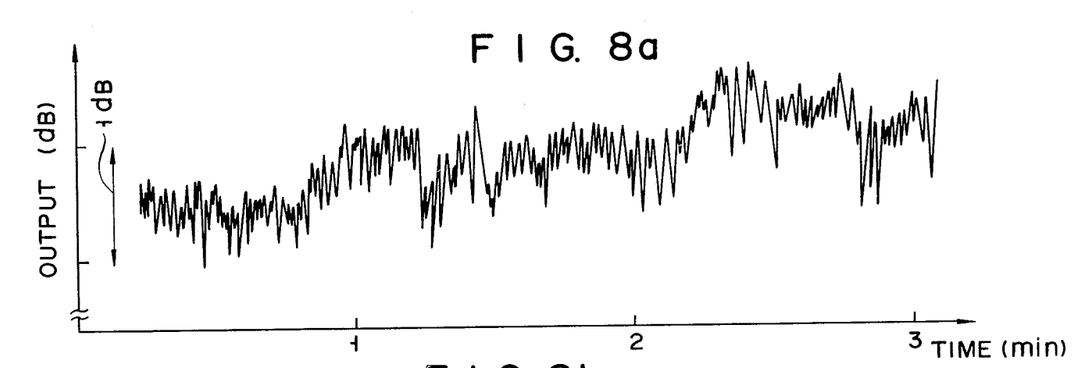
Figure 8B:
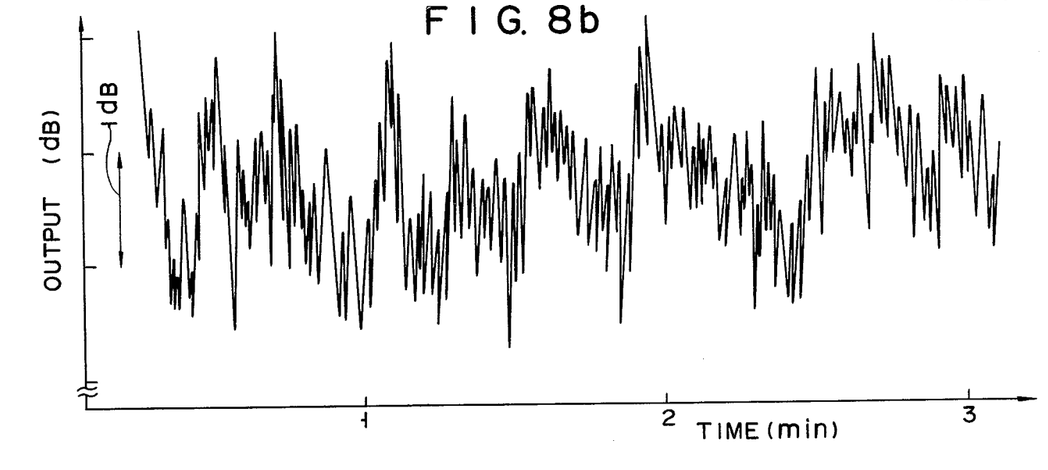

FIG. 6 shows a further thermal treatment apparatus. In this case, the film 1 proceeds round a heating roller 41, whereby a predetermined thermal treatment is effected. The heating roller 41 includes a heater and a temperature sensing element (neither of which are shown), and its surface is always held at a predetermined temperature level (i.e., either the first or second temperature level noted above). A film roll 42 is set on a pay-off reel 43 and paid off to proceed round a guide roller 44, the heating roller 41 and a guide roller 45 and be taken up on a take-up reel 46. The film is adapted to proceed with its base film side in contact with the periphery of the heating roller 41. As the film proceeds round the heating roller 41, it is heated to a predetermined temperature level.

The effects of the method according to the invention may be described as follows. FIGS. 7a, 7b, 8a and 8b show magnetic tape output characteristics, respectively. Data on these characteristics was obtained by carrying out recording and reproduction under conditions of 5,000 Hz and −5 dB. All of the tested magnetic tapes consisted of a polyester base film which was 6 μm thick and a cobalt-alloy magnetic layer which was approximately 2,800 Å thick and was deposited on the base film. The output characteristics of FIGS. 7b and 8b were obtained via a magnetic tape produced from a film, which film was thermally treated by the heating roller (see FIG. 6) with the heating temperature set to 130° C. and a film running speed of 5 m/min, subsequent to the formation of the magnetic layer (i.e., via a magnetic tape produced from a film which was free of additional thermal treatment). The output characteristic of FIG. 7a was obtained via a magnetic tape produced from a film, which film was thermally treated in the heating vessel, its temperature being elevated from a normal temperature to approximately 120° C. in 2 hours and, then, held at approximately 120° C. for 2 hours, being subsequently cooled to the normal temperature in 2 hours and, then, being additionally thermally treated. The output characteristic of FIG. 8a was obtained via a magnetic tape produced from a film, which film was additionally thermally treated by a heating roller with a heating temperature set to approximately 120° C. and a running speed of 6 m/min. Said additional thermal treatment was subsequent to the main thermal treatment. It may be seen that the output characteristics of FIGS. 7b and 8b, obtained with magnetic tapes which were only thermally treated to remove curls and wrinkles of the film, have fluctuations at small pitches of approximately 0.5 dB and, also, fluctuations at large pitches occurring a couple of times for every minute. By way of contrast, the output characteristics of FIGS. 7a and 8b, which were obtained via additionally thermally treated magnetic tapes, have very small fluctuations. Obviously, output characteristic fluctuations can be drastically reduced by the additional thermal treatment.

As described above; according to the invention, the film with the magnetic layer formed thereon is thermally treated to remove its curls and wrinkles, and is then additionally thermally treated to remove the local thermal stresses of the magnetic layer. Thus, it is possible to obtain a magnetic recording film of a thin metallic film type, which has uniform magnetic characteristics, and with which the output fluctuations are very small. In addition, the additional thermal treatment can be accomplished by using the same apparatus as was used in the main thermal treatment, i.e., it can be readily accomplished without requiring a separate apparatus, by merely altering thermal treatment conditions, such as the heating temperature.

What is claimed is:

1. A method of manufacturing a magnetic recording film of a thin metallic film type, comprising:
   a step of forming a magnetic layer in the form of a thin metallic film on a base film, while providing a predetermined level of tension in said base film;
   a thermal treatment step of heating said film with said magnetic layer to a first temperature level, at which thermal shrinkage of the base film is caused, while providing said predetermined tension in said film; and, then, cooling said film, thereby removing any curls and wrinkles found therein; and
   an additional thermal treatment step of heating said thermally treated film to a second temperature level, which is lower than said first temperature level, and cooling said film, thereby removing thermal stress in said magnetic layer.

2. The method according to claim 1, wherein said thermal treatment step includes: a process of winding said film into a roll while providing said predetermined tension in said film; a process of heating said film roll to a reaction-free temperature level slightly lower than said first temperature level and holding it at said reaction-free temperature level for a predetermined period of time; and a process of subsequently heating said film roll to said first temperature level and, then, cooling said film roll.

3. The method according to claim 2, wherein said additional thermal treatment step includes: a process of unwinding said thermally treated film roll and re-winding the film into a roll, while providing said predetermined tension in said film; a process of heating said film roll to said second temperature level and holding it thereat for a predetermined period of time; and a process of cooling said heated film roll.

4. The method according to claim 2, wherein the rate of heating said film to said reaction-free temperature level and the rate of cooling said heated film from said first temperature level are substantially equal.

5. The method according to claim 3, wherein the rate of heating said film to said second temperature level and the rate of cooling said film from said second temperature level are substantially equal.

6. The method according to claim 1, wherein said thermal treatment step includes a process of driving said film with said magnetic layer at a predetermined speed, while providing said predetermined tension in said film; and a process of heating said running film to said first temperature level, via a heater.

7. The method according to claim 1, wherein said additional thermal treatment step includes a process of driving said thermally treated film at a predetermined speed, while providing said predetermined tension in said film, and a process of heating said running film to said second temperature level, via a heater.

8. The method according to claim 1, wherein said thermal treatment step includes a process of driving said film with said magnetic layer round a heating roller heated to said first temperature level, at a predetermined speed, while providing said predetermined tension in said film, thereby heating said film to said first temperature level.

9. The method according to claim 1, wherein said additional thermal treatment step includes a process of driving said thermally treated film round a heating roller heated to said second temperature level, at a predetermined speed, while providing said predetermined tension in said film, thereby heating said film to said second temperature level.

* * * * *

UNITED STATES PATENT AND TRADEMARK OFFICE
CERTIFICATE OF CORRECTION

PATENT NO. : 4,446,170
DATED : May 1, 1984
INVENTOR(S) : Seizou WATANABE

It is certified that error appears in the above-identified patent and that said Letters Patent is hereby corrected as shown below:

Col. 1, line 40, delete "touch" and substitute -- contact --;
      line 49, after "56-51547" insert -- , U.S. Serial No. 363,441, filed March 30, 1982 --;
      line 60, delete "its";

Col. 2, line 54, delete "may" and substitute -- will --;
      line 65, delete "round" and substitute -- around --;
      line 68, after "direction of" insert -- the --;

Col. 3, line 26, after "heating or" insert -- a --;
      line 28, delete "round" and insert -- around --;
      line 58, delete "taken or" and insert -- the --;
      line 60, delete "taken for";
      line 63, after "temperature" change "T1" to -- T10 --;

Col. 4, line 9, after "temperature" change "T2" to -- T20 --;

UNITED STATES PATENT AND TRADEMARK OFFICE
CERTIFICATE OF CORRECTION

PATENT NO. : 4,446,170

DATED : May 1, 1984

INVENTOR(S) : Seizou WATANABE

It is certified that error appears in the above-identified patent and that said Letters Patent is hereby corrected as shown below:

Col. 5, line 14, delete "round" and insert -- around --;
       line 20, after "reels 34 and 39," insert -- and --;
       line 30, delete "round" and insert -- around --;
       line 37, delete "round" and insert -- around --;
       line 42, delete "round" and insert -- around --;

Col. 6, line 18, delete ";" and insert -- , --.

Claim 8, Col. 8, line 5, delete "round and insert -- around --;

Claim 9, Col. 8, line 12, delete "round" and insert -- around --.

Signed and Sealed this

Twenty-second Day of January 1985

[SEAL]

Attest:

DONALD J. QUIGG

Attesting Officer      Acting Commissioner of Patents and Trademarks